J. W. COMBS.
Devices for Molding Rings for Bracelets, &c.

No. 156,881. Patented Nov. 17, 1874.

Witnesses
M. E. R. Smith.
S. Emmermann.

John W. Combs
by Earle H. Smith, Atty.

UNITED STATES PATENT OFFICE.

JOHN W. COMBS, OF NEWARK, NEW JERSEY.

IMPROVEMENT IN DEVICES FOR MOLDING RINGS FOR BRACELETS, &c.

Specification forming part of Letters Patent No. 156,881, dated November 17, 1874; application filed April 3, 1874.

*To all whom it may concern:*

Be it known that I, JOHN W. COMBS, of Newark, in the county of Essex and State of New Jersey, have invented certain new and useful Improvements in Bracelet-Machines, whereof the following is a specification:

My said invention relates to a machine or apparatus to facilitate the chucking and forming of rings of sheet metal for bracelets, scarf-rings, &c.

Said improvements may be said to consist, essentially, in a revolving cylinder, having a stem or mandrel fixed in its center, and carrying suitable devices for securely holding on such mandrel a form-plate or mold, over which the blank bracelet, or its like, is to be formed by forcible contact with a suitably-shaped roller, or other competent forming-tool, which is pressed against the edge or other portion of the said blank to shape or ornament the same, while it is firmly held fast to the mold by a removable clamp. The cylinder is encircled by an adjustable sleeve, to assist and expedite the adjustment of the said clamp with respect to the mold.

The improvements may be applied to use in a variety of ways. The blanks may be formed on circular molds, and afterward placed in dies and made oval and other shapes by pressure or percussion. The preferable way is to have the parts adapted to a lathe or lathe-chuck constructed for turning oval forms.

I will, therefore, proceed to describe the construction and method of using the improved machine or apparatus when made for use in connection with such oval-chuck and a lathe.

Figure 1:
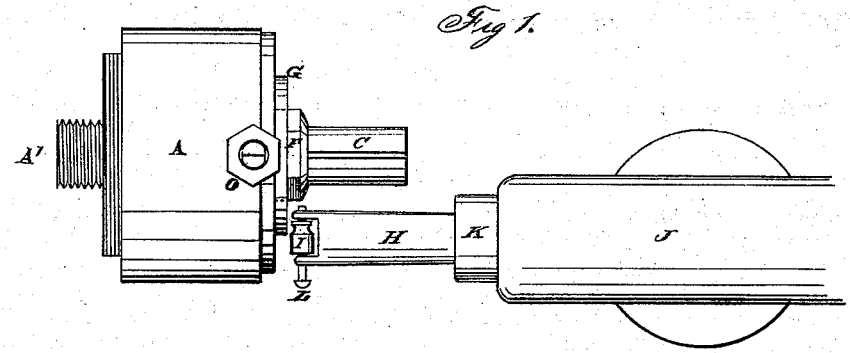
Figure 3:
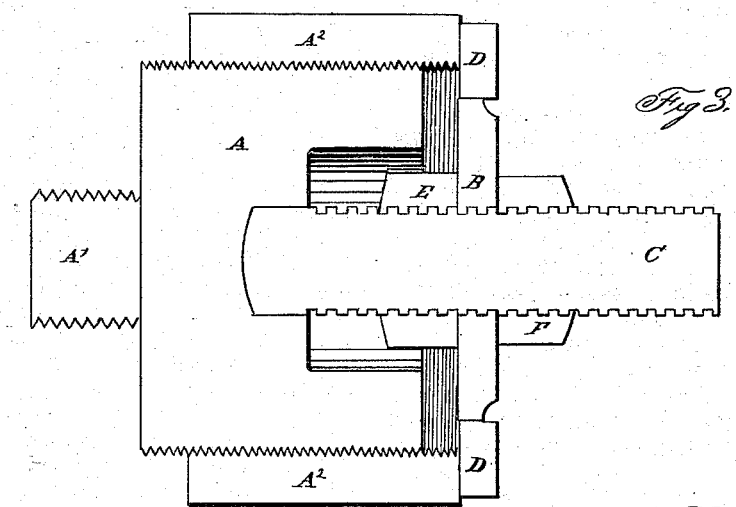
Figure 2:
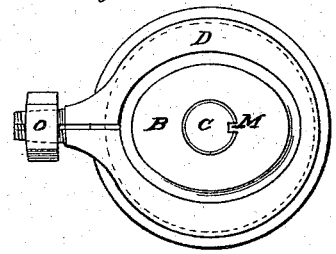
Figure 4:
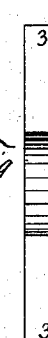
Figure 5:
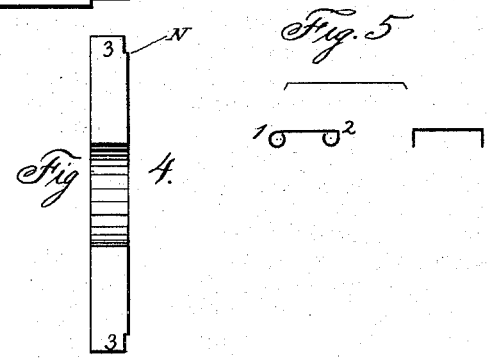

In the annexed drawing, Figure 1 is an exterior view, as seen from above. Fig. 2 is a front-end view of the holding and revolving parts, with a mold. Fig. 3 is a longitudinal section of the same. Fig. 4 is a like section of another form of mold. Fig. 5 shows cross-sections of rings or bracelets.

A is the primary cylinder, to which are attached all the parts for holding and revolving the blank. The cylinder has a screw-shank, A¹, whereby to affix it to the wabbling axis of the oval-chuck. B is the mold or form-plate, the edge or periphery of which determines the shape of the edges or other portions of the bracelet, according to the shape of such mold. It is placed and secured on the stem or mandrel C, which is fixed centrally in the cylinder A. The mold, when of oval contour, must sustain a fixed and unalterable relation to the cylinder A, and to the mechanism of the oval-chuck, which carries and revolves the said cylinder. The mandrel C is, therefore, provided with a longitudinal groove or key-seat; and the mold B has a spline, M, or key to fit the groove, (see Fig. 2,) whereby the relation of the mold to, and its rotation with, the cylinder and its mandrel, and hence the fixed relation of the mold to the mechanism of the oval-chuck, is preserved and assured under all the changes incident to the use of the apparatus.

The best way, in preparing a new oval mold, is to slip it on the mandrel C, with its spline in the mandrel's groove, and, having secured it, proceed to turn it down to the oval contour which the oval lathe or chuck will naturally impart. At the same time such peripheral shapes of mold, as illustrated in cross-section, required for shaping or edge-turning of the metal blank ring are also turned in the mold.

The shapes shown in section in Figs. 3 and 4, consisting of a rounded or a square rabbet at the corner, are those required to make the respective forms of blank indicated in Fig. 5. Other shapes may be made, each being determined by the special shape in cross-section of the particular bracelet or ring to be produced.

To adapt the machine to various widths of rings or bracelets, the mandrel is provided with an adjustable maintaining-block, E, and securing-nut F. The block E is to maintain the mold B at such relative position with respect to the front end of the cylinder A and to the width of the blank G that, when the blank is placed on the mold, with its rear edge against the end of the cylinder A, so much of the front edge of said blank shall project beyond the mold B as is required to form the turned-in portions of the edge of the bracelet or blank. D is a removable clamp, for holding the blank to the mold B. Such mold may be larger or smaller; but the clamp used should be conformed thereto. Said clamp is split open at one side, and a nut, O, on a tapering shank draws the sides inward, compressing it upon, and griping the blank to, the mold. When properly placed on the blank and its mold, the holding-clamp D should have its face flush with the front edge of the mold. To provide for so adjusting the clamp to the mold, whatever the width of blank, the periphery of the cylinder A is encircled by a sleeve, $A^2$, which is adjustable longitudinally thereon; and when the mold has been adjusted on the mandrel C for the width of the blank, the securing-nut F is brought up and screwed tightly against the face of the mold, the mandrel being threaded for that purpose, thereby forcing it squarely against the maintaining-block E behind it, and thus maintaining the mold at a true right angle to the axis of the cylinder A and central mandrel. Said nut is omitted in Fig. 2 to show the spline M. H is a tool-holder, secured in the ordinary hollow mandrel K of the tail-stock J of the lathe in place of the usual dead-center. Said holder H has a roller, I, in the end, turning on a removable pin, L. The roller has a suitable groove or depression, or it may be a ridge, adapted in shape to the work to be done.

The operation may be described as follows: Supposing the completed form or shape in cross-section of the bracelet or ring to be such as seen at 1 2 in Fig. 5, when the blank has been placed and secured on its mold, the tail-stock and tool-holder H are arranged at one side of the mandrel C, with the groove in the roller I in line with the rear side of the mold—that is, at the location where the point of a tool would be placed for turning the perimeter of the mold. The lathe is now started, revolving the cylinder and mandrel C, and with it the blank. The tool or roller in the tail-stock is now run up to its work, by the ordinary screw in the tail-stock, until the edge of the blank meets the side of the groove in roller I. The feeding up of the tool being continued, such edge follows the curve of the bottom of the said groove, and is turned over into the depression or rabbet in the corner of the mold in the form or shape of 1, Fig. 5. The clamp D not only holds the blank to the mold, but part of its inner surface serves as a support, in some cases, to the outer surface of the blank. When, for example, the round turn has been made on the edge of the blank, as above, if it be desired to square the outer corner of said turned edge, the roller I is removed and reversed, substituting the plain part thereof for the groove. The plain or flat part of the tool or roller is now brought to bear with pressure on the said rounded edge, and this causes the outer corner to retreat outward against the inner surface of the clamp D until such corner assumes the shape seen at 2 in Fig. 5, which it does of itself, and without any other attention of the operator. When the edge of the blank is only to be turned inward at right angles, as for bracelets that are to be finished with a lining, a form of mold is used having a simple perimetral rabbet. (See 3 in Fig. 4.) When this form of mold is used, it is so adjusted on the mandrel C, with respect to the end of the cylinder A, that only so much of the edge of the blank shall project beyond the mold as will about reach across and fill the rabbet, which is about equal in depth to the thickness of the metal of the blank. The result is, that when turned over and pressed or rolled down into the rabbet, such edge is forced against the step N of the rabbet and finished smoothly, thus obviating the subsequent trimming of the said edge. Many other forms may be imparted to the blank, depending on the shape of the mold and of the forming tool or tools employed.

The invention is not confined to a roller for a former; but any other competent tool may be substituted in connection with a holding and revolving mechanism, substantially such as I have described.

Having thus described my said invention, what I claim therein as new is—

1. The primary cylinder A, having the central mandrel, receiving an adjustable maintaining-block and securing-nut, or their equivalent, for holding and rotating the form-plate or mold.

2. The mold or form-plate, made with a suitable rabbet to receive the turned-in edge of the blank, in combination with the divided and compressible clamp to gripe the blank to the mold, and to afford support from without in process of squaring the turned edge of the bracelet or ring, substantially as hereinbefore specified.

3. Combining, with the primary cylinder, the adjustable encircling sleeve or its equivalent, for the purposes specified.

4. The form-plate or mold, when made of oval shape, provided with a spline within its central opening, in combination with the grooved mandrel affixed to the cylinder A, or its equivalent, for the purpose and substantially as hereinbefore set forth.

5. The combination, with the holding mechanism, constructed substantially as described, for holding and rotating the blank, of a competent forming-tool for automatically forming the edge of the blank into the desired shape, as set forth.

JOHN W. COMBS.

Witnesses:
FRED. H. COLLUM,
J. W. BROWNE.